United States Patent
Niki et al.

(12) 
(10) Patent No.: US 6,339,998 B1
(45) Date of Patent: Jan. 22, 2002

(54) WATER FEED DEVICE FOR SMALL ANIMAL REARING APPARATUS

(75) Inventors: Motohiro Niki, Tokyo-To; Atsushi Kidachi, Sakura, both of (JP)

(73) Assignee: Motohiro Niki, et al., Tokyo-To (JP)

( * ) Notice: Subject to any disclaimer, the term of this patent is extended or adjusted under 35 U.S.C. 154(b) by 0 days.

(21) Appl. No.: 09/454,650

(22) Filed: Dec. 6, 1999

(51) Int. Cl.$^7$ .............................................. A01K 7/00
(52) U.S. Cl. .................................................... 119/72.5
(58) Field of Search .................. 119/72.5, 72; 251/120, 251/125, 339

(56) References Cited

U.S. PATENT DOCUMENTS

| | | | | |
|---|---|---|---|---|
| 3,874,343 A | * | 4/1975 | Niki ........................... | 119/72.5 |
| 4,006,716 A | * | 2/1977 | Cross ......................... | 119/72.5 |
| 4,346,672 A | | 8/1982 | Niki ........................... | 119/72.5 |
| 4,819,585 A | * | 4/1989 | Dolan et al. ................ | 119/72.5 |
| 5,003,922 A | * | 4/1991 | Niki et al. ................... | 119/418 |

* cited by examiner

*Primary Examiner*—Charles T. Jordan
*Assistant Examiner*—Yvonne R Abbott
(74) *Attorney, Agent, or Firm*—Ladas & Parry

(57) ABSTRACT

A water feed device for small animal rearing apparatus has a water feed member (2) and a closing valve (5) operated by the water feed member (2). The water feed member (2) is sheathed in a sheathing pipe (3) so that a thin annular space (M) is formed between the water feed member (2) and the sheathing pipe (3). The sheathing pipe (3) is disposed coaxially in a protective pipe (4) so that a thick annular space (N) is formed between the sheathing pipe (3) and the protective pipe (4). When a small animal touches a fore end portion (2a) of the water feed member (2) projecting from the extremity of the sheathing pipe (3), the valve (5) is opened to permit water flow along the water feed member (2) toward the fore end portion (2a) to enable the small animal drink water. Since the thick annular space (N) is much greater than the thin annular space (M), mischievous small animals try to thrust litter, food or dirt into the greater annular space and do not thrust the same into the thin annular space, so that basic water feeding function of the water feed member (2) is maintained.

5 Claims, 2 Drawing Sheets

WATER FEED DEVICE FOR SMALL ANIMAL REARING APPARATUS

BACKGROUND OF THE INVENTION

1. Field of the Invention

The present invention relates to a water feed device for supplying drinking water to small animals for experimental purposes, such as mice or rats, kept in a small animal rearing apparatus.

2. Description of the Related Art

Generally, a small animal rearing apparatus is used for keeping small laboratory animals, such as mice or rats, to save rearing labor and to use space effectively. The small animal rearing apparatus has a plurality of shelves disposed one upon another to form a vertical arrangement of rearing cage storing spaces. Water feed pipes included in water feed devices are arranged in rearing cage storage spaces so as to project into rearing cages, respectively, to feed drinking water to small animals kept in the rearing cages.

A prior art water feed device disclosed in, for example, U.S. Pat. No. 4,346,672 issued Aug. 31, 1982 has an elongate water feed member, such as a pipe or a rod, having a fore end portion and a base end portion, and a normally closed automatic closing valve connected to the base end portion of the water feed member. When a small animal touches the fore end portion of the water feed member with its nose or mouth so as to tilt the water feed member, the automatic closing valve is opened and water supplied from a water source flows along the water feed member to enable the small animal to drink water.

In this prior art water feed device for a small animal rearing apparatus, the water feed member is sheathed in an sheathing pipe to prevent water dripping from the fore end portion of the water feed member from dropping into the cage. Mischievous small animals confined in the cage often throw or carry intentionally litter, food and/or dirt scattered in the cage into an annular space between the water feed member and the sheathing pipe and, sometimes, play with the litter, food and/or dirt stuffed in the annular space.

When the annular space is stuffed with litter or the like, the fore end portion of the water feed member is dislocated, the water feed member is tilted, the automatic closing valve is opened and water continues to flow wastefully into the cage. Even if the sheathing pipe surrounding the water feed pipe is tilted so as to decline toward the outside of the cage to prevent water from flowing into the cage, the flow of water toward the outside of the cage is obstructed by litter and the like stuffed in the annular space and, consequently, the cage is flooded with water. Litter and the like swell unexpectedly greatly when wet and the swollen litter and the like fill up the annular space completely. Furthermore, if the small animals repetitively push litter and the like into the annular space, playing therewith, the litter and the like are thrust deep into the annular space and reach a coil spring provided for the automatic closing valve. If this occurs, the elastic force of the coil spring becomes entirely or partly ineffective because the litter and the like are thrust into the spaces between the convolutions of the coil spring. Then, the automatic closing valve is kept open and water continues to flow into the cage.

On the other hand, if the annular space is stuffed with litter and the like, they hinders free movement of the water feed member so that the water feed pipe becomes unable to tilt. If this occurs, water is not supplied and small animals are not unable to drink water. This is a serious problem.

On the other hand, if the annular space is stuffed with litter and the like to an extent that permits the movement of the water feed member to enable feeding water, water flows through the litter and the like stuffed in the annular space before the same is fed to the small animals, which is very unsanitary and contaminates water.

Furthermore, the prior art water feed member is relatively slender and weak at the base end, so that water leakage tends to occur at the base end and moreover the base end tends to be disconnected due to shocks imparted thereto by small animals, the forces given by mischievous hanging of small animals from the water feed member, shocks and forces imparted to the water feed member by persons when changing the cages, feeding the animals, cleaning the cages and so on, moving the rearing apparatus and its components, sterilizing the cages and other associated components, etc.

The present invention has been made to solve the foregoing problems and it is therefore an object of the present invention to provide a water feed device for a small animal rearing apparatus, which is capable of properly, safely, and sanitarily feeding water even if the water feed device has an opening which can be stuffed mischievously with litter, food or dirt by small animals and which is strong against outer forces and shocks.

SUMMARY OF THE INVENTION

According to one aspect of the present invention, a water feed device for a small animal rearing apparatus comprises: an elongate water feed member having a fore end portion to be touched by a small animal and a base end portion opposite the fore end portion; a sheathing pipe sheathing the water feed member therein so as to define a thin annular space surrounding the water feed member; a closing valve having an inlet side connected to a water source and an outlet side connected to the water feed member; and a protective pipe coaxially receiving the sheathing pipe therein so as to define a thick annular space surrounding the sheathing pipe and having a thickness greater than that of the thin annular space. In this water feed device, the closing valve includes a holding means holding the base end portion of the water feed member to hold the water feed member at a valve closing position and to enable the water feed member to turn on the base end portion to a valve opening position when a small animal touches the fore end portion of the water feed member, the closing valve is closed when the water feed member is at the valve closing position and is open to enable water to flow along the water feed member toward the fore end portion of the same when the water feed member is tilted to the valve opening position.

The protective pipe may comprise a plurality of coaxially nested pipes.

Preferably, the thickness of the thin annular space surrounding the water feed member is in the range of 2 to 3 mm, and the thickness of the thick annular space surrounding the sheathing pipe is in the range of 6 to 9 mm.

The thick annular space between the sheathing pipe and the protective pipe is an attractive space for a mischievous small animal to put foreign matters in, and the small animal will not try to put foreign matters in the thin annular space between the water feed member and the sheathing pipe.

Since the water feed member is protected by the sheathing pipe, and the sheathing pipe is protected by the protective pipe, the safety of the water feed device is enhanced, and the water feed member and the sheathing pipe are protected from shocks that may be exerted thereon by small animals and those that may be exerted thereon by the attendants engaged in work with the rearing cage and so on.

The above and other objects, features and advantages of the present invention will become more apparent from the following description taken in connection with the accompanying drawings.

DESCRIPTION OF THE PREFERRED EMBODIMENT

Figure 1:
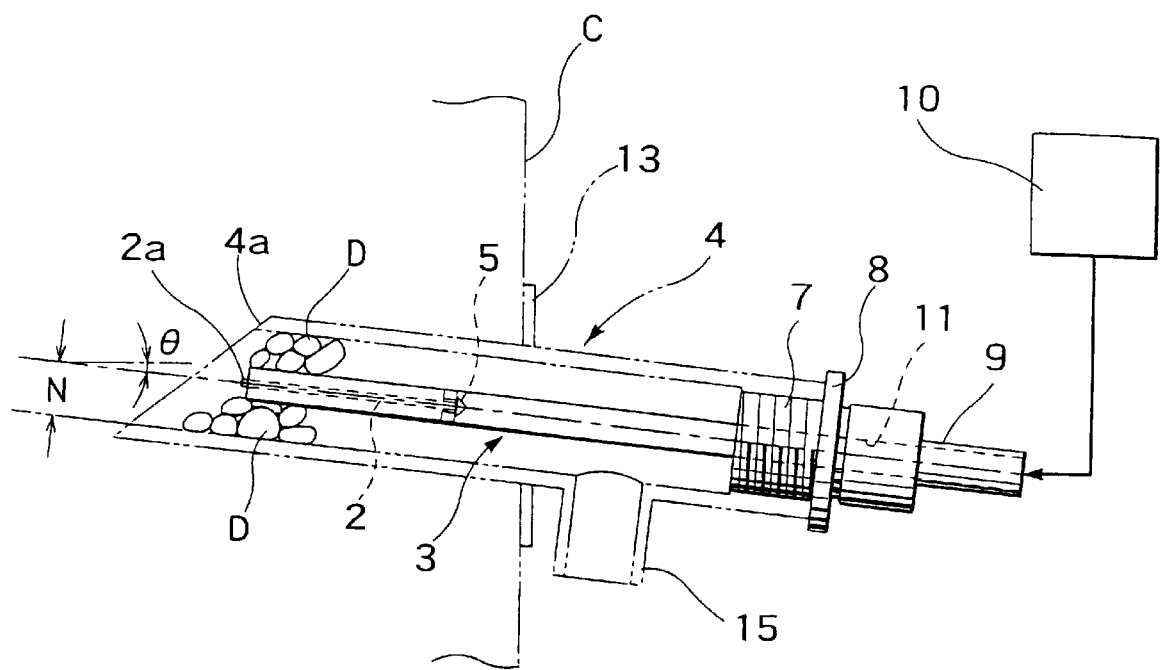
FIG. 1 is a side elevation of a water feed device in a preferred embodiment of the present invention for a small animal rearing apparatus.
Figure 2:
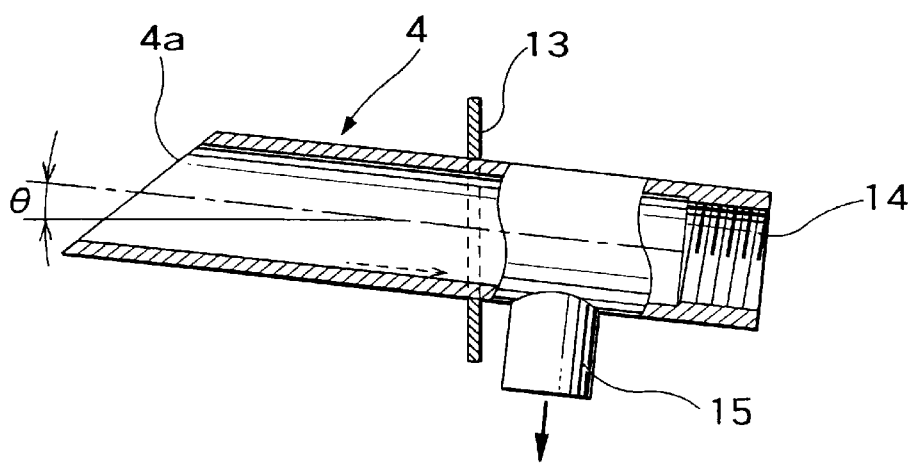
FIG. 2 is a partly sectional side elevation of a protective pipe included in the water feed device shown in FIG. 1.

Referring to FIG. 1, an elongate water feed member 2 is sheathed in a sheathing pipe 3, and the sheathing pipe 3 is surrounded by a protective pipe 4 shown in FIG. 2. The water feed member 2 is, for example, a solid rod. The water feed member 2 has a fore end portion 2a, a left end portion as viewed in FIG. 1, which slightly projects from the extremity of the sheathing pipe 3. A small animal touches the fore end portion 2a. An automatic closing valve 5 is connected to the base end portion of the water feed member 2 opposite the fore end portion 2a. The sheathing pipe 3 is a simple pipe. The sheathing pipe 3 is connected to a pipe connecting member having an externally threaded, enlarged base end portion 7, a flange 8 formed at the back end of the externally threaded portion 7, and a connecting pipe 9 connected to a water source 10. An axial bore 11 is formed through the connecting pipe 9 and the threaded portions 7 The bore 11 is in communication with the interior of the sheathing pipe 3. The base end portion of the sheathing pipe 3 is fitted in the axial bore 11.

As shown in FIG. 2, the inside diameter of the protective pipe 4 is greater than the outside diameter of the sheathing pipe 3 and is integrally provided in its middle portion with a flange 13. A fore end portion 4a of the protective pipe 4 is beveled. The protective pipe 4 has a base end portion provided with an internal thread 14. A drain pipe 15 is joined so as to project downward to a portion of the protective pipe 4 between the flange 13 and the base end portion provided with the internal thread 14. The flange 13 of the protective pipe 4 is attached to a side wall of a known cage C for confining small animals therein so that the protective pipe 4 extends substantially horizontally as indicated by imaginary lines in FIG. 1. The protective pipe 4 extends substantially through the side wall of the cage C and the fore end part 4a projects into a rearing space inside the cage C. The back end portion of the protective pipe 4 provided with the internal thread 14 and the drain pipe 15 lie outside the cage C. The flange 13 is attached to the side wall of the cage C so that the fore end portion 4a is slightly higher than the base end portion and the axis of the protective pipe 4 is inclined at an angle θ to a horizontal line.

The sheathing pipe 3 is inserted in the protective pipe 4 as shown in FIG. 1. The sheathing pipe 3 having the base end portion fitted in the axial bore 11 of the pipe connecting member is inserted through the base end of the protective pipe 4 into the protective pipe 4, and the externally threaded portion 7 of the pipe connecting member is screwed in the internally threaded base end portion 14 of the protective pipe 4 as shown in FIG. 1. In this state, the sheathing pipe 3 is substantially coaxial with the protective pipe 4, and the fore end of the sheathing pipe 3 is slightly behind the beveled end surface of the fore end portion 4a.

Figure 3:
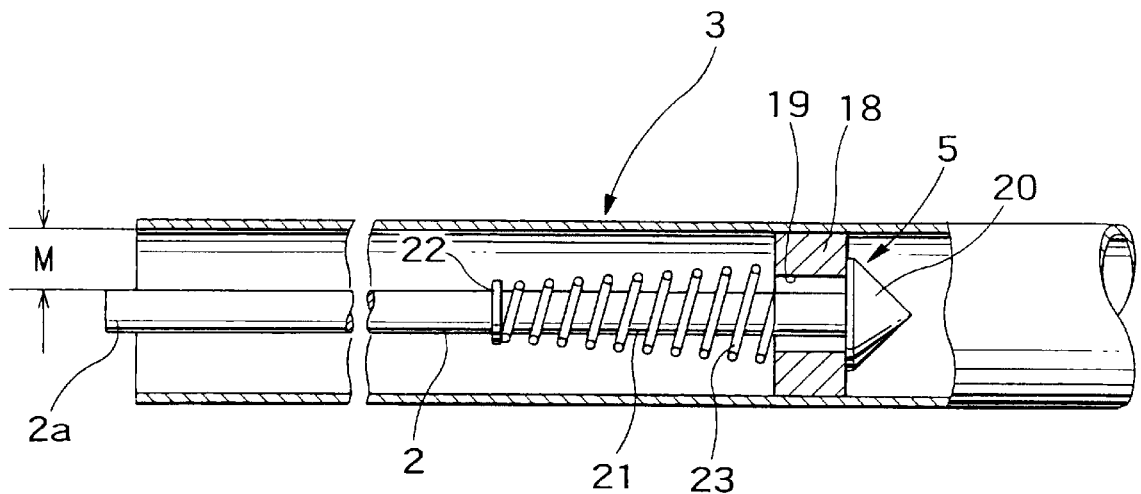
FIG. 3 is a partly sectional side elevation of a water feed member, a sheathing pipe and a closing valve included in the water feed device shown in FIG. 1, in a closed state.
Figure 4:
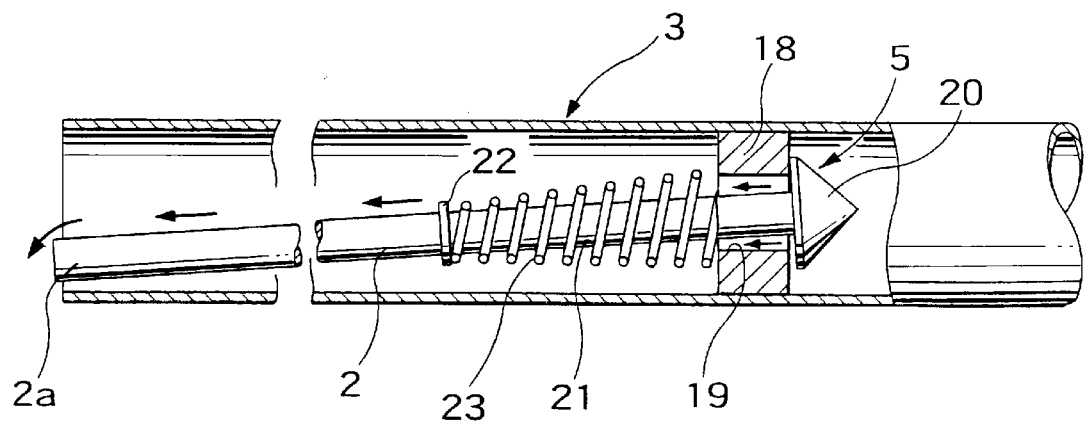
FIG. 4 is a partly sectional side elevation of the water feed member, the sheathing pipe and the closing valve included in the water feed device shown in FIG. 1, in an open state.

FIG. 3 shows the water feed member 2 kept at a valve closing position and FIG. 4 shows the water feed member 2 tilted to a valve opening position. A cylindrical valve seat 18 provided with a through hole 19 in its central portion is fixedly disposed in a middle portion of the sheathing pipe 3. The valve seat 18 can be fixed in place by, for example, crimping the sheathing pipe 3. A valve element comprises a conical valve head 20 and a valve stem 21 formed integrally and coaxially with the valve head 20. The valve stem 21 is inserted in the through hole 19 of the valve seat 18 from the back end of the same. The valve stem 21 serves also as the water feed member 2. The flat end surface of the conical valve head 20 is seated on and kept in close contact with the flat back end surface of the valve seat 18 to keep the automatic closing valve 5 closed. A compression coil spring 23 is compressed between the fore end surface of the valve seat 18 and a spring stopper 22 fixed to a portion of the valve stem 21. The coil spring 23 acts on the water feed member 2 to keep the flat end surface of the valve head 20 in close contact with the flat back end surface of the valve seat 18. Thus, the compression coil spring 23 serves as a holding means for keeping the water feed member 2 at the valve closing position with the flat end surface of the conical valve head 20 in close contact with the back end surface of the valve seat 18 as shown in FIG. 3, and permitting the water feed member 2 to be tilted as shown in FIG. 4 when a small animal touches the fore end portion 2a of the water feed member 2. The radial thickness M (FIG. 3) of an annular space between the water feed member 2 and the sheathing pipe 3 is in the range of, for example, about 2 to about 3 mm (normally, on the order of 2 mm). The radial thickness N (FIG. 1) of an annular space between the sheathing pipe 3 and the protective pipe 4 is in the range of, for example, about 6 to about 9 mm (normally, on the order of 6 mm).

The operation of the water feed device for the small animal rearing apparatus will be explained. In a state where nothing is done by the small animal to the water feed device, the water feed member 2 is kept in the valve closing position by the compression coil spring 23 in the sheathing pipe 3 and the flat end surface of the conical valve head 20 is in close contact with the flat back end surface of the valve seat 18 as shown in FIG. 3. Consequently, the automatic closing valve 5 is closed to stop the flow of water supplied from the water source 10 (FIG. 1).

When the small animal brings its nose or mouth into contact with the fore end portion 2a of the water feed member 2 to drink water, the water feed member 2 is tilted from the valve closing position to the valve opening position shown in FIG. 4, elastically deforming the compression coil spring 23. Consequently, the flat end surface of the conical valve head 20 is tilted relative to the flat back end surface of the valve seat 18 as shown in FIG. 4, opening the automatic closing valve 5. Then, water is allowed to flow through the through hole 19 and to flow along the water feed member 2 (the valve stem 21) to the fore end portion 2a and the small animal is able to drink water. When the small animal separates its nose or mouth from the fore end portion 2a of the water feed member 2, the water feed member 2 is returned to the valve closing position by the resilience of the compression coil spring 23 as shown in FIG. 3 to close the automatic closing valve 5.

Water spilt while the small animal is drinking water drops in the protective pipe 4, flows inside the protective pipe 4 toward the back end of the protective pipe 4 as indicated by the broken line arrow in FIG. 2, and is drained through the drain pipe 15.

Since the radial thickness M (FIG. 3) of the thin annular space between the water feed member 2 and the sheathing pipe 3 is in the range of, for example, about 2 to about 3 mm (normally, on the order of 2 mm), it is difficult for the small animal to stuff the thin annular space mischievously with litter, scattered food or dirt. The radial thickness N (FIG. 1) of the thick annular space between the sheathing pipe 3 and the protective pipe 4 is in the range of, for example, about 6 to about 9 mm (normally, on the order of 7 mm). Since the thickness N of the thick annular space is far greater than the thickness M of the thin annular space, the mischievous small animal try to stuff the thick annular space of the thickness N with litter, food or dirt and does not try to stuff the thin annular space of the width M. Even if the thick annular space of the thickness N is stuffed with foreign matters D, such as litter, food and/or dirt, the basic water feeding function of the water feed device is not hindered at all by the foreign matters D because the sheathing pipe 3 and the protective pipe 4 defining the thick annular space of the thickness N need not move relative to each other. The small animal engages itself wholly in putting foreign matters D into the thick annular space of the thickness N and does not intend to stuff the thin annular space of the thickness M with foreign matters. Accordingly, the water feed member is able to turn freely in the sheathing pipe 3 and hence the basic function of the water feed device to feed drinking water and to stop feeding drinking water is not affected by the mischievous act of the small animal.

When necessary, the sheathing pipe 3 sheathing the water feed member 2 therein may be inserted in an assembly of a plurality of coaxially nested protective pipes. The water feed member 2 may be a pipe instead of the solid rod.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A water feed device for a small animal rearing apparatus, comprising:

a stationary sheathing pipe extending in a substantially horizontal direction and having an open end and a fixed opposite base end;

an elongated water feed member extending within said sheathing pipe to define a thin annular space (M) between the water feed member and the sheathing pipe, said water feed member being rockable within said sheathing pipe and having a fore end portion, to be touched by a small animal, located in said open end of the sheathing pipe and a rear end portion opposite the fore end portion;

a closing valve having an inlet side connected to a water source and an outlet side connected to said rear end portion of the water feed member;

said closing valve including holding means holding the rear end portion of the water feed member to normally maintain the water feed member at a valve closing position and to enable the water feed member to tilt to a valve opening position when a small animal touches the fore end portion of the water feed member, the closing valve being closed when the water feed member is at said valve closing position and being open to enable water to flow along the water feed member toward the fore end portion of the same when the water feed member is tilted to the valve opening position; and a stationary protective pipe coaxially receiving the sheathing pipe therein so as to define a thicker annular space (N) surrounding the sheathing pipe, said thicker annular space having a thickness greater than that of the thin annular space (M).

2. The water feed device according to claim 1, wherein the thin annular space surrounding the water feed member has a thickness in the range of about 2 to about 3 mm.

3. The water feed device according to claim 1, wherein the thick annular space has a thickness in the range of about 6 to about 9 mm.

4. The water feed device according to claim 1, wherein said closing valve is located within said sheathing pipe.

5. The water feed device according to claim 1, wherein said stationary sheathing pipe and said stationary protective pipe are fixedly connected to each other at rear ends thereof.

* * * * *